United States Patent
Ogawa et al.

(10) Patent No.: US 7,477,243 B2
(45) Date of Patent: Jan. 13, 2009

(54) APPARATUS FOR CONTROLLING THE SHIFT OF VIRTUAL SPACE AND METHOD AND PROGRAM FOR CONTROLLING SAME

(75) Inventors: Yasuji Ogawa, Tokyo (JP); Kouki Shimiya, Tokyo (JP); Jun Sakai, Tokyo (JP)

(73) Assignees: EIT Co., Ltd., Tokyo (JP); XIROKU, Inc., Tsukuba-shi (JP)

( * ) Notice: Subject to any disclaimer, the term of this patent is extended or adjusted under 35 U.S.C. 154(b) by 864 days.

(21) Appl. No.: 10/447,828

(22) Filed: May 29, 2003

(65) Prior Publication Data

US 2004/0051709 A1   Mar. 18, 2004

(30) Foreign Application Priority Data

May 31, 2002  (JP) .............................. 2002-160761

(51) Int. Cl.
*G09G 5/00* (2006.01)
(52) U.S. Cl. .................. 345/204; 345/156; 345/184; 345/621; 345/629; 345/630; 345/672
(58) Field of Classification Search ............... 345/204, 345/420, 621, 173, 184, 419, 438, 433, 672, 345/473–475, 629, 630, 168, 156–158, 418–422; 348/208.1, 36, 51; 463/31, 32; 715/738, 715/782, 760, 720

See application file for complete search history.

(56) References Cited

U.S. PATENT DOCUMENTS

| | | | | |
|---|---|---|---|---|
| 3,632,866 A | * | 1/1972 | King ............................. | 348/51 |
| 5,029,144 A | * | 7/1991 | Griffin ........................... | 367/11 |
| 5,471,322 A | * | 11/1995 | Murata ......................... | 358/502 |
| 5,483,261 A | | 1/1996 | Yasutake | |
| 5,798,752 A | * | 8/1998 | Buxton et al. ............... | 715/863 |
| 5,801,704 A | | 9/1998 | Oohara et al. | |
| 5,936,614 A | * | 8/1999 | An et al. ....................... | 345/173 |
| 5,999,185 A | * | 12/1999 | Kato et al. ................... | 345/420 |
| 6,144,366 A | | 11/2000 | Numazaki et al. | |
| 6,154,211 A | * | 11/2000 | Kamachi et al. ............ | 345/419 |
| 6,160,551 A | | 12/2000 | Naughton et al. | |
| 6,368,217 B2 | * | 4/2002 | Kanno et al. .................. | 463/36 |
| 6,489,944 B2 | * | 12/2002 | Numaoka ..................... | 345/156 |
| 6,597,380 B1 | * | 7/2003 | Wang et al. .................. | 715/782 |
| 6,650,343 B1 | * | 11/2003 | Fujita et al. .................. | 715/760 |
| 6,710,770 B2 | | 3/2004 | Tomasi et al. | |
| 6,750,848 B1 | * | 6/2004 | Pryor ........................... | 345/168 |

(Continued)

FOREIGN PATENT DOCUMENTS

JP         7-230352         8/1995

(Continued)

*Primary Examiner*—Prabodh M. Dharia
(74) *Attorney, Agent, or Firm*—Foley & Lardner LLP (57) ABSTRACT

A virtual-space shift control apparatus includes a detecting element that detects a touch operation or a drag operation of a pointing device having a plurality of pointing elements, performed on a display screen and a viewpoint-position information generator that generates viewpoint position information of a virtual space image based on the detected touch or drag operation of the detecting element. A three-dimensional image generator is provided that generates data on the virtual space image seen from a viewpoint indicated by the viewpoint position information and outputting a three dimensional image to the display.

24 Claims, 8 Drawing Sheets

U.S. PATENT DOCUMENTS

| | | | |
|---|---|---|---|
| 7,009,613 B2 * | 3/2006 | Goden | 345/473 |
| 2001/0030668 A1 * | 10/2001 | Erten et al. | 345/863 |
| 2002/0158866 A1 * | 10/2002 | Batchko | 345/419 |
| 2003/0006982 A1 * | 1/2003 | Yokoyama et al. | 345/419 |
| 2004/0046744 A1 * | 3/2004 | Rafii et al. | 345/168 |
| 2004/0233222 A1 * | 11/2004 | Lee et al. | 345/621 |
| 2005/0005241 A1 * | 1/2005 | Hunleth et al. | 715/720 |
| 2005/0162389 A1 * | 7/2005 | Obermeyer et al. | 345/161 |
| 2007/0018973 A1 * | 1/2007 | Shih et al. | 345/419 |

FOREIGN PATENT DOCUMENTS

| | | |
|---|---|---|
| JP | 9-212686 | 8/1997 |
| JP | 9-231004 | 9/1997 |
| JP | 11-73271 | 3/1999 |
| JP | 2001-290585 | 10/2001 |

* cited by examiner

APPARATUS FOR CONTROLLING THE SHIFT OF VIRTUAL SPACE AND METHOD AND PROGRAM FOR CONTROLLING SAME

BACKGROUND OF THE INVENTION

1. Field of the Invention

The present invention relates to an apparatus for controlling the shift of a virtual space and a method and a program for controlling the same. More particularly, the present invention relates to an apparatus for generating virtual space shift information required for virtual space shift image processing and controlling the shift of a computer graphics (CG) model when the user shifts the virtual space image displayed on a computer terminal and a method and a program for controlling the same.

2. Description of the Related Art

Virtual spaces sometimes called cyberspaces used in virtual reality and expressed with CG are conventionally known. The user can sense information while moving in a virtual space displayed on a computer terminal. Common man-machine interfaces for moving in the virtual space on the computer terminal include mice, joysticks and so on.

The mice are used to convert a shift operation over a virtual space display area with a cursor into shift information in the space in accordance with the operation. The joysticks are used to convert the direction and the angle of the inclination of the stick into shift information in the space. However, the mice and the joysticks which are conventional interfaces are difficult for users who have not used computers to get a sense of performing shift operation in a virtual space.

Man-machine interfaces for performing similar operations as the mice and the joysticks also include touch panels, which allow the change of a display by directly pointing a shifted position in the virtual space with a finger or the like. However, with general touch panels, a shift operation in a virtual space similar to that with the mice or the joysticks cannot be performed with only a finger, which requires another operation, thus leading to troublesome operation and avoiding an intuitive operation.

SUMMARY OF THE INVENTION

The present invention has been made in consideration of such problems and accordingly, it is an advantage of the present invention to provide an apparatus for controlling a shift in virtual space which allows the user to perform various virtual space shift operations by a simple operation with a finger or the like, and a method and a program for controlling the same.

The present invention has been made to solve the above problems. According to an aspect of the invention, a virtual-space shift control apparatus is provided for shifting a virtual space image displayed on a display screen of a display, the apparatus comprising includes a detecting element for detecting a touch operation or a drag operation of a pointing device having a plurality of pointing parts, which is performed on the display screen and a viewpoint-position information generator for generating viewpoint position information of the virtual space image on the basis of the detection of the detecting element. The apparatus also includes a three-dimensional image generator for generating data on a virtual space image seen from a viewpoint indicated by the viewpoint position information and outputting it to the display.

According to another aspect of the invention, a virtual-space shift control apparatus includes an operation detecting element for detecting the number of pointing parts of a pointing device and the respective touch positions of the plurality of pointing parts, the pointing device performing a touch operation or a drag operation on a prescribed display area on which a virtual space image is displayed and an information control section for generating viewpoint shift information for shifting the viewpoint on the virtual space image on the basis of the number of the pointing parts and the respective touch positions of the pointing parts and outputting it to the display. The apparatus also includes a display for displaying the virtual space on the basis of the shift information outputted from the information control section.

According to the invention, preferably, the information control section generates viewpoint shift information for shifting the position of the viewpoint to the touch position on the basis of the position of the touch operation by one of the plurality of pointing parts.

According to the invention, preferably, the information control section receives time-series data on the distance and the direction from the starting point to the end point of the drag operation by one of the plurality of pointing parts and generates viewpoint shift information for shifting the viewpoint on the basis of the time-series data on the distance and the direction from the starting point toward the end point.

According to the invention, preferably, the display displays a virtual plane formed of a two-dimensional space image and a virtual space formed of a three-dimensional virtual space image at the same time; and a viewpoint icon for the virtual space, which is displayed in the virtual plane, receives time-series data on the distance and the direction from the starting point to the end point of the drag operation by one of the plurality of pointing parts, and the information control section generates viewpoint shift information for shifting the viewpoint in the virtual space on the basis of the time-series data on the distance and the direction from the starting point to the end point of the drag operation.

According to the invention, preferably, the display displays a virtual plane formed of a two-dimensional space image and a virtual space formed of a three-dimensional virtual space image at the same time; and a viewing angle icon for the viewpoint in the virtual space, which is displayed in the virtual plane, receives data on a turning angle of the drag operation by one of the plurality of pointing parts, and the information control section generates viewpoint shift information for turning the viewing angle by the turning angle.

According to the invention, preferably, the information control section receives data on the distance and the direction from the first touch position of the initial touch operation to the second touch position of the next touch operation, and generates viewpoint shift information for shifting the viewpoint on the basis of the distance and the direction from the first touch position to the second touch position.

According to the invention, preferably, the information control section determines the position of a split point at which the line connecting the first touch position and the second touch position in a designated proportion on the basis of the first touch position and the second touch position, and generates viewpoint shift information for changing the speed or the acceleration at which the viewpoint is shifted, on the basis of the time-series changes of the position of the split point.

According to the invention, preferably, the display displays a virtual plane formed of a two-dimensional space image and a virtual space formed of a three-dimensional virtual space image at the same time; and the information control section receives time-series data on the distance between the touch positions by two of the plurality of pointing parts, and generates scale information for enlarging or reducing the virtual plane on the basis of the time-series changes of the distance between the touch positions by the two pointing parts.

According to the invention, preferably, the information control section receives time-series data on the position of the central point of the first to $n^{th}$ touch positions, and generates viewpoint shift information for shifting the viewpoint on the basis of the time-series changes of the position of the central point of the first to $n^{th}$ touch positions.

According to the invention, preferably, the display displays an operation icon for operating the viewpoint in the virtual space; and the information control section receives time-series data on the distance and the direction from the starting point to the end point of the drag operation of a drag section of the operation icon, and generates viewpoint shift information for shifting the viewpoint on the basis of the time-series changes of the distance and the direction from the starting point to the end point.

According to yet another aspect of the invention, a virtual-space shift control system is provided for shifting a virtual space image displayed on a display screen, includes the processes of: detecting a touch operation or a drag operation of a pointing device having a plurality of pointing parts, which is performed on the display screen; generating viewpoint position information of the virtual space image on the basis of the detection of the detecting element; and generating a three-dimensional image for generating data on a virtual space image seen from a viewpoint indicated by the viewpoint position information and outputting it to the display.

According to another aspect of the invention, a virtual space shift control system is provided for shifting a virtual space image displayed on a display screen, wherein the operation detecting element detects the number of pointing parts of a pointing device and the respective touch positions of the plurality of pointing parts, the pointing device performing a touch operation or a drag operation on a prescribed display area on which a virtual space image is displayed, the information control section generates viewpoint shift information for shifting the viewpoint on the virtual space image on the basis of the number of the pointing parts and the respective touch positions of the pointing parts, and outputs it to the display; and the display displays the virtual space on the basis of the shift information outputted from the information control section.

According to the invention, preferably, the information control section generates viewpoint shift information for shifting the position of the viewpoint to the touch position, on the basis of the position of the touch operation by one of the plurality or pointing parts.

According to the invention, preferably, the information control section receives time-series data on the distance and the direction from the starting point to the end point of the drag operation by one of the plurality of pointing parts, and generates viewpoint shift information for shifting the viewpoint in the virtual space on the basis of the time-series data on the distance and the direction from the starting point to the end point.

According to the invention, preferably, the display displays a virtual plane formed of a two-dimensional space image and a virtual space formed of a three-dimensional virtual space image at the same time; and a viewpoint icon for the virtual space, which is displayed in the virtual plane, receives time-series data on the distances and the direction from the starting point to the end point of the drag operation by one of the plurality of pointing parts, and the information control section generates viewpoint shift information for shifting the viewpoint in the virtual space on the basis of the time-series data on the distance and the direction from the starting point to the end point of the drag operation.

According to the invention, preferably, the display displays a virtual plane formed of a two-dimensional space image and a virtual space formed of a three-dimensional virtual space image the same time; and a viewing angle icon for the viewpoint in the virtual space, which is displayed in the virtual plane, receives data on the turning angle of the drag operation by one of the plurality of pointing parts, and the information control section generates viewpoint shift information for turning the viewing angle by the According to the invention, preferably, the information control section receives data on the distance and the direction from the first touch position of the initial touch operation to the second touch position of the next touch operation, and generates viewpoint shift information for shifting the viewpoint on the basis of the distance and the direction from the first touch position to the second touch position.

According to the invention, preferably, the information control section determines the position of a split point at which the line connecting the first touch position and the second touch position is split in a designated proportion on the basis of the first touch position and the second touch position, and generates viewpoint shift information for changing the speed or the acceleration at which the viewpoint is shifted, on the basis of the time-series changes of the position of the split point.

According to the invention, preferably, the display displays a virtual plane formed of a two-dimensional space image and a virtual space formed of a three-dimensional virtual space image at the same time; and the information control section receives time-series data on the distance between the touch positions by two of the plurality of pointing parts, and generates scale information for enlarging or reducing the virtual plane on the basis of the time-series data on the distance between the touch positions by the two pointing parts.

According to the invention, preferably, the information control section receives time-series data on the position of the central point of the first to $n^{th}$ touch positions, and generates viewpoint shift information for shifting the viewpoint on the basis of the time-series changes of the position of the central point of the first to $n^{th}$ touch positions.

According to the invention, preferably, the display further displays an operation icon for operating the viewpoint in the virtual space; and the information control section receives time-series data on the distance and the direction from the starting point to the end point of the drag operation of a drag section of the operation icon, and generates viewpoint shift information for shifting the viewpoint on the basis of the time-series changes of the distance and the direction from the starting point to the end point.

According to another aspect of the invention, a program is provided for use in a virtual-space shift control apparatus for shifting a virtual space image displayed on a display screen of a display, the apparatus includes a detecting element for detecting a touch operation or a drag operation of a pointing device having a plurality of pointing parts, which is performed on the display screen; a viewpoint-position information generator for generating viewpoint position information of the virtual space image on the basis of the detection of the detecting element; and a three-dimensional image generator for generating data on a virtual space image seen from a viewpoint indicated by the viewpoint position information and outputting it to the display.

According to another aspect of the invention, a program is provided for executing a virtual-apace shift control apparatus includes an operations detecting element for detecting the number of pointing parts of a pointing device and the respective touch positions of the plurality of pointing parts, the pointing device performing a touch operation or a drag operation on a prescribed display area on which a virtual space image is displayed; an information control section for generating viewpoint shift information for shifting the viewpoint on the virtual space image on the basis of the slumber of the pointing parts and the respective touch positions of the pointing parts, and outputting it to the display; and a display for displaying the virtual space on the basis of the shift information outputted from the information control section.

According to another aspect of the invention, a recording medium is provided in which a program for executing a virtual-space shift control apparatus for shifting a virtual space image displayed on a display screen of a display is recorded, the apparatus includes a detecting element for detecting a touch operation or a drag operation of a pointing device having a plurality of pointing parts, which is performed on the display screen; a viewpoint-position information generator for generating viewpoint position information of the virtual space image on the basis of the detection of the detecting element; and a three-dimensional image generator for generating data on a virtual space image seen from a viewpoint indicated by the viewpoint position information and outputting it the display.

According to another aspect of the invention, a recording medium is provided in which a program for executing a virtual-space shift control apparatus is recorded, the apparatus includes an operation detecting element for detecting the number of pointing parts of a pointing device and the respective touch positions of the plurality of pointing parts, the pointing device performing a touch operation or a drag operation on a prescribed display area on which a virtual space image is displayed; an information control section for generating viewpoint shift information for shifting the viewpoint on the virtual space image on the basis of the number of the pointing parts and the respective touch positions of the pointing parts and outputting it to the display; and a display for displaying the virtual space on the basis of the shift information outputted from the information control section.

DESCRIPTION OF THE PREFERRED EMBODIMENT

Figure 1:
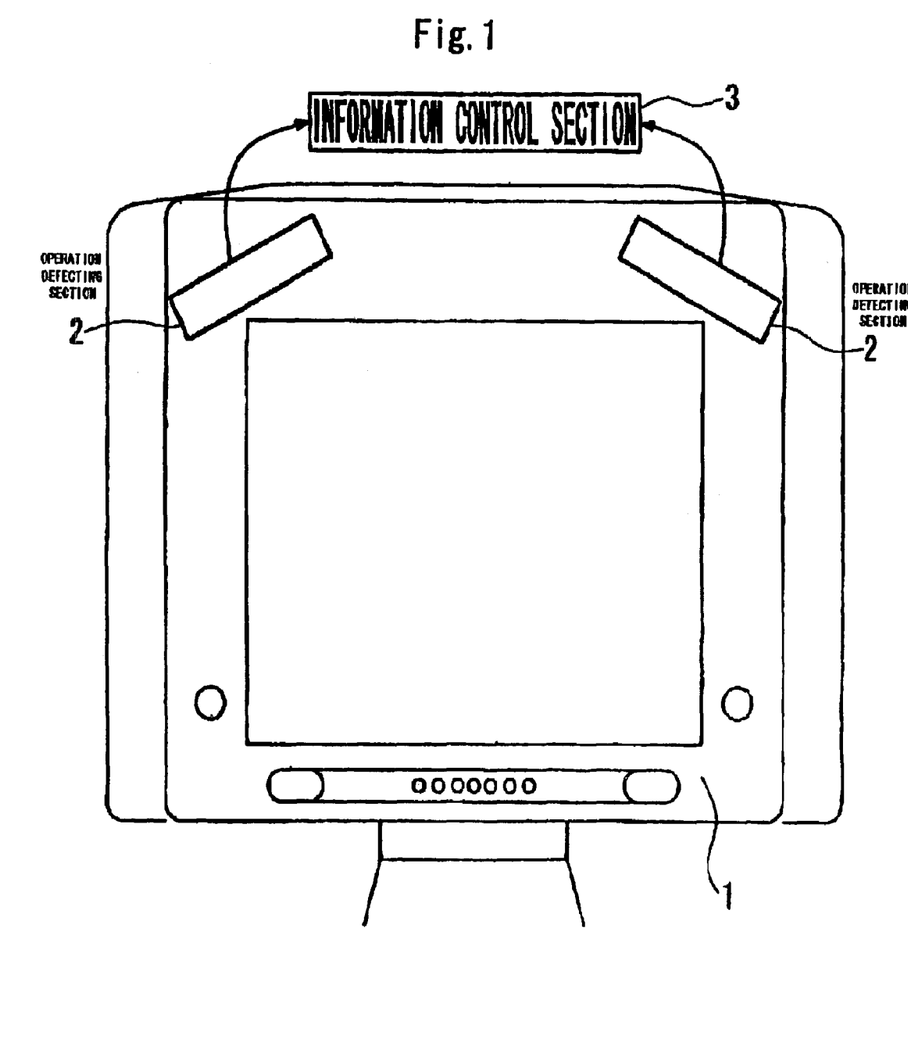
FIG. 1 is a schematic diagram of a virtual-space shift control apparatus according to an embodiment of the present invention.

An embodiment of the present invention will be described with reference to the drawings hereinafter. FIG. 1 is a schematic diagram of a virtual-space shift control apparatus according to the embodiment. A display 1 displays a virtual space image generated by a CG model. When a prescribed display area of the display 1 is touched or dragged by a pointing device having a plurality of pointing elements such as fingers, operation detecting elements 2 sense the number of pointing elements of the touch operation or the drag operation and the respective touch positions of the pointing elements. An information control section 3 generates viewpoint shift information for moving the viewpoint in the display of the virtual space in accordance with the sensed number of pointing elements and the sensed touch positions of the pointing elements and outputs it to the display.

The operation of the virtual-space shift control apparatus according to an embodiment of the present invention will then be described.

The operation detecting elements 2 are mounted on the left and right of the display 1, as shown in FIG. 1, and scans the surface of the display 1 at a high speed at regular intervals by an optical coordinate measuring method. When a touch operation or a drag operation is performed on the display with the pointing elements, the operation detecting element 2 senses the number and the direction of the pointing elements that block scanning light by the blockage of the light. The information control section 3 receives the detection of the direction of the pointing elements that block the light by the different operation detecting elements and calculates accurate pointing position coordinates on the principle of trigonometrical survey. The information control section 3 then determines the distances among the pointing elements on the basis of the calculated position coordinates of the pointing elements.

The information control section 3 generates viewpoint shift information for shifting the viewpoint on a virtual space display on the basis of the respective position coordinates of the pointing elements and the distances among the pointing elements and outputs it to the display 1. The display 1 displays a virtual space image on the basis of the shift information outputted from the information control section 3.

As described above, the arrangement of the embodiment permits the generation of shift information to a CG model displayed in a virtual space, the shift information being for shifting the viewpoint in the virtual space display on the basis of the touch operation or the drag operation of a pointing device having a plurality of pointing elements in a prescribed area, and allows the shift information to be incorporated to the CG model.

Figure 2:
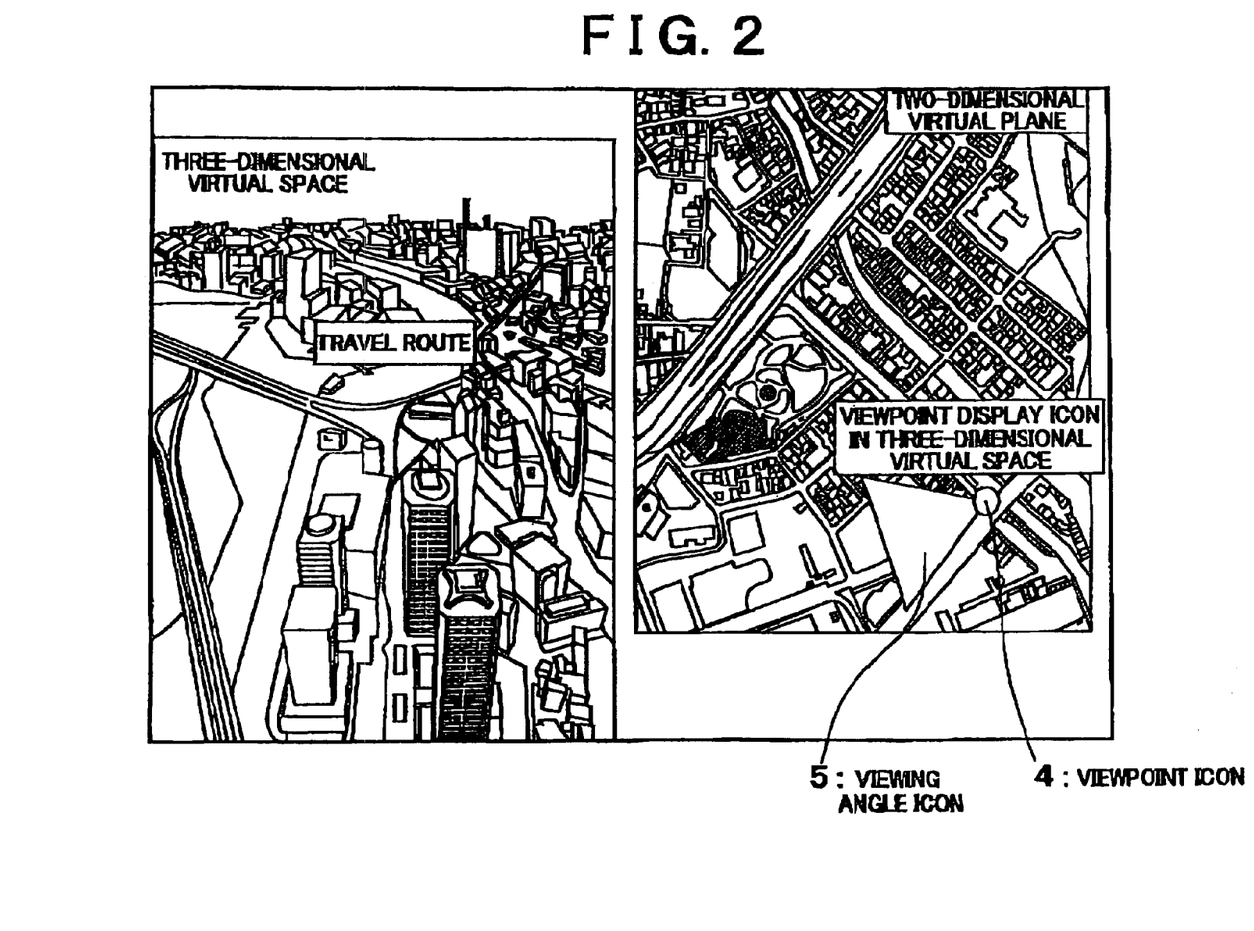
FIG. 2 is a general view of a two-dimensional virtual plane and a three-dimensional virtual space of a city displayed on a screen.

A specific processing procedure of the virtual-space shift control apparatus according to an embodiment of the present invention will now be described. FIG. 2 is a general view of a two-dimensional virtual plane and a three-dimensional virtual space of a city displayed on the display 1 of FIG. 1. A city map is displayed in the two-dimensional virtual plane, on which a viewpoint display icon indicating a viewpoint in the three-dimensional virtual space is displayed. The viewpoint display icon has a viewpoint icon 4, which indicates the position coordinates of the viewpoint and serves as the center of the turn of the icon, and a viewing angle icon 5 which indicates the viewing angle in the three-dimensional virtual space.

The two-dimensional virtual plane and the three-dimensional virtual space are displayed on the same position coordinates, wherein when the viewpoint is moved, the shifts thereof are displayed in synchronization with each other. The three-dimensional virtual space is displayed by a coordinate value that indicates the height and by a rolling angle, a heading angle, a pitch angle, and an angle of view that specify the direction of the viewpoint.

The information control section a determines how many fingers are used for operation by the user, which of a touch operation and a drag operation was performed, and at which display area and to which object the operation was performed, and generates shift information including the position coordinates, the vertical coordinate, and the change of the rolling angle, the heading angle, the pitch angle, and the angel of view. A description of the specific individual process will be described hereinafter.

When the virtual-space shift control apparatus is activated, the information control section 3 displays an address input screen and the display 1 displays a viewpoint display icon on an area map that is a two-dimensional virtual plane image and in the position of an inputted address on the basis of the address inputted by the user. A three-dimensional virtual space image viewed from the position of the viewpoint display icon is then displayed.

Subsequently, a specific operation will be described when the operation detecting element 2 has detected that a touch operation or a drag operation was performed on the display with pointing elements.

Figure 3:
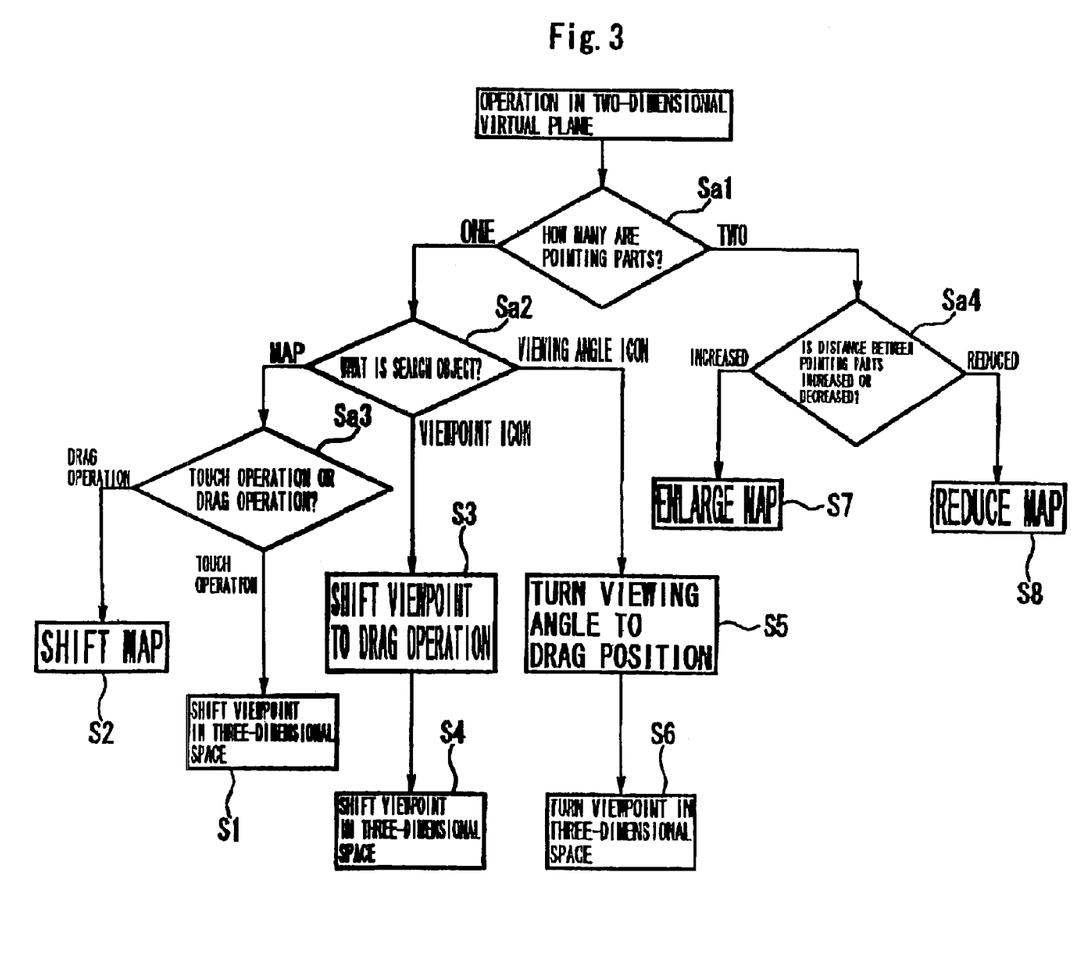
FIG. 3 is a flowchart of a process in an information control section 3 when a touch operation or a drag operation is performed in a two-dimensional plane.

The case in which the touch operation or the drag operation is performed in the two-dimensional virtual plane will first be described with reference to the flowchart of the process in the information control section 3 of FIG. 3.

(1) Viewpoint Shift Operation by Touch Operation

When the user performs a touch operation on the city map in the two-dimensional virtual plane with a finger (one in step Sa1, the object of search is a map in step Sa2, and a touch operation in step Sa3), the operation detecting element 2 detects the touch position and outputs it to the information control section 3. The information control section 3 shifts the position of the viewpoint to the touch position by the detection of the touch position, generates viewpoint shift information for shifting the viewpoint, and outputs it to the display 1. The display 1 displays a two-dimensional virtual plane in which the viewpoint display icon on the city map is shifted and a three-dimensional virtual space image which is seen from a shifted viewpoint (refer to step S1).

(2) MAP SHIFT OPERATION BY DRAG OPERATION

When the user performs a drag operation on the city map in the two-dimensional virtual planes with a finger (one in step Sa1, the object of search is a map in step Sa2, and a drag operation in step Sa8), the operation detecting element 2 detects the distance and the direction from the starting point to the end point of the drag operation in time sequence and outputs them to the information control section 3. The information control section 3 generates viewpoint shift information for shifting the map from the starting point toward the end point of the drag operation by a distance from the starting point to the end point on the basis of the detection of the distance and the direction from the starting point to the end point, and outputs it to the display 1. The display 1 displays a two-dimensional virtual plane in which the map was shifted by a distance traveled by the drag operation on the basis of the viewpoint shift information outputted from the information control section 3 (refer to step S2).

(3) VIEWPOINT SHIFT OPERATION BY DRAG OPERATION

When the user performs a drag operation on a viewpoint icon 4 displayed on the city map in the two-dimensional virtual plane with a finger (one in step Sa1 and the object of search is a viewpoint icon in step Sa2), the operation detecting element 2 detects the distance and the direction from the starting point to the end point of the drag operation in time sequence and outputs them to the information control section 8. The information control section 3 generates viewpoint shift information for shifting the viewpoint display icon and the viewpoint in the three-dimensional virtual space to the end point of the drag operation on the basis of the distance and the direction from the starting point to the end point, and outputs it to the display 1. The display 1 displays a two-dimensional virtual plane in which the viewpoint display icon was shifted to the end point of the drag operation and a three-dimensional virtual space viewed from the shifted view point (refer to steps S3 and S4).

(4) VIEWING ANGLE SHIFT OPERATION

When the user performs a drag operation on the viewing angle icon 5 of the viewpoint display icon displayed on the city map in the two-dimensional virtual plane with a finger (one in step Sa1 and the object of search is a viewing angle icon in step Sa2), the operation detecting element 2 detects the distance, the direction, and the turning angle from the starting point to the end point of the drag operation, and outputs them to the information control section 3. The information control section 3 turns the viewing angle icon 5 to the end point of the drag operation on the basis of the distance and the direction from the starting point to the end point, generates viewing angle information for turning the viewpoint in the three-dimensional virtual space by the detected turning angle, and outputs it to the display 1. The display 1 displays a two-dimensional virtual plane in which the viewing angle icon 5 was turned to the end point of the drag operation and a three-dimensional virtual space viewed from the turned viewpoint (refer to steps S5 and S6).

(5) SCALING OPERATION

When the user performs a touch operation on the city map in the two-dimensional virtual plane with two fingers (two in step Sa1), the operation detecting element 2 detects the distance between the two fingers in time sequence and outputs it to the information control section 3. The information control section 3 generates scale information for displaying a reduced map in response to the fact that the distance between the two fingers is reduced when the two fingers come close to each other (when the distance was reduced in step Sa4), and outputs it to the display 1. The information control section 3 also generates scale information for displaying an enlarged map in response to the fact that the distance between the two fingers is increased when the two fingers are separated from each other (when the distance was increased in step Sa4), and outputs it to the display 1. The display 1 displays a three-dimensional virtual space and a two-dimensional virtual plane which were reduced or enlarged on the basis of the scale information outputted from the information control section 8 (refer to steps B7 and S8).

Figure 4:
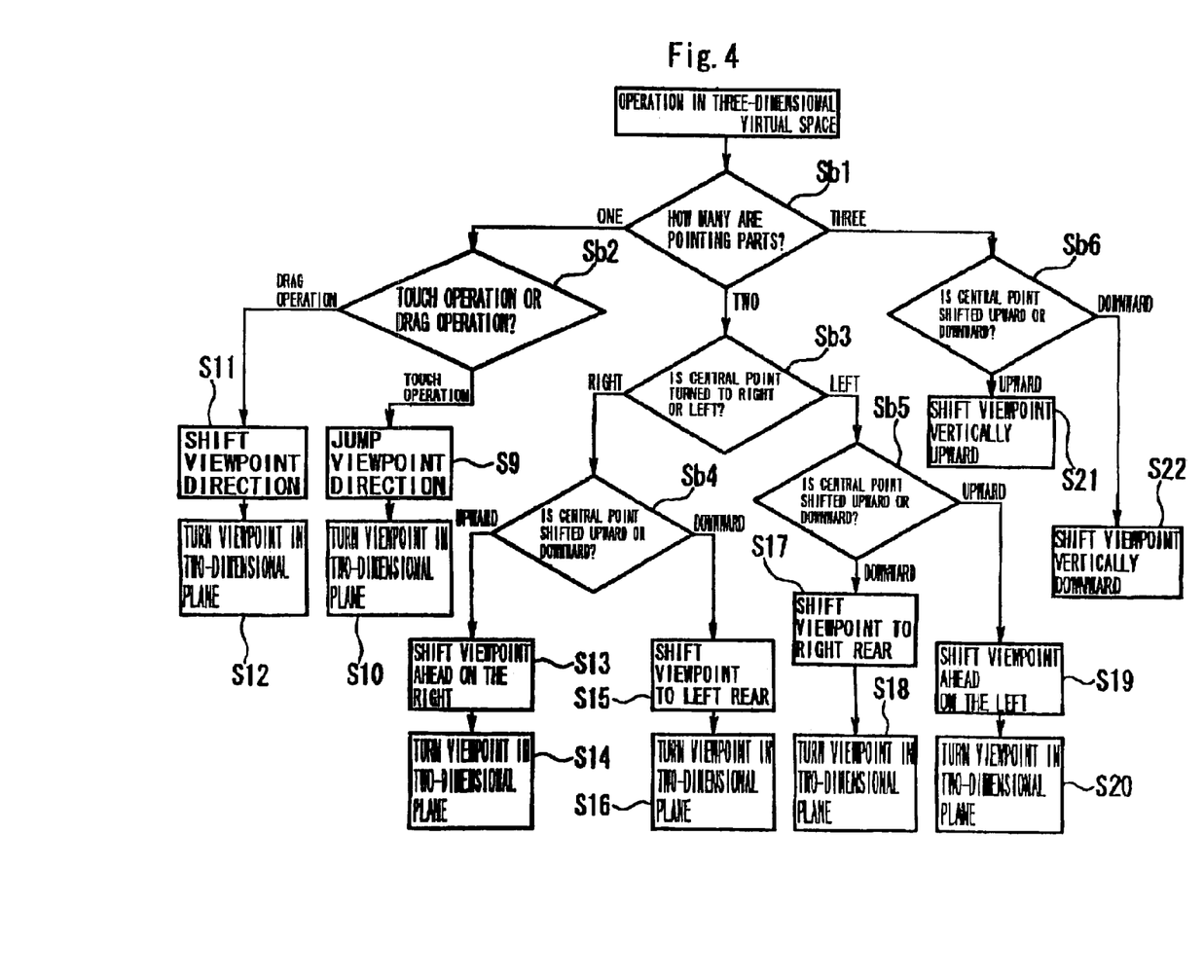
FIG. 4 is a flowchart of a process in the information control section 3 when a touch operation or a drag operation is performed in a three-dimensional space.

The case in which the touch operation or the drag operation is performed in the three-dimensional virtual space will be described with reference to the flowchart of the process in the information control section 3 of FIG. 4.

(6) VIEWPOINT DIRECTION SHIFT OPERATION BY TOUCH OPERATION

When the user performs a touch operation on a stereoscopic city map in the three-dimensional virtual space with a finger (one in step Sb1 and a touch operation in stop Sb2 of FIG. 4), the operation detecting element 2 detects the touch position and outputs it to the information control section 3. The information control section 3 generates viewpoint direction information for changing the rolling angle, the heading angle, and the pitch angle for specifying the viewpoint direction to change the viewpoint direction to the touch position and viewpoint shift information for turning the viewing angle icon 5, and outputs them to the display 1. The display 1 displays a three-dimensional virtual space in which the viewpoint direction is changed to the touch position in the stereoscopic city map in the three-dimensional virtual space on the basis of the viewpoint direction information outputted from the information control section 3 (refer to step S9). The display 1 also displays a two-dimensional virtual plane in which the viewing angle icon 5 is turned on the basis of the viewpoint shift information for turning the viewing angle icon 5(refer to step S10).

(7) VIEWPOINT DIRECTION SHIFT OPERATION BY DRAG OPERATION

When the user performs a drag operation on the stereoscopic city map in the three-dimensional virtual space with a finger (one in step Sb1 and a drag operation in step Sb2 of FIG. 4), the operation detecting element 2 detects the distance and the direction from the starting point to the end point of the drag operation and outputs them to the information control section 8. The information control section 3 generates viewpoint direction information for changing the rolling angle, the heading angle, and the pitch angle which specify the viewpoint direction to change the viewpoint direction by a distance from the starting point to the end point of the drag operation in the direction from the starting point to the end point of the drag operation, on the basis of the detection of the distance and the direction from the starting point to the end point of the drag operation, and outputs it to the display 1. The display 1 displays a three-dimensional virtual space in which the viewpoint direction was changed by the distance from the starting point to the end point of the drag operation in the direction from the starting point to the end point of the drag operation in the stereoscopic city map in the three-dimensional virtual space, on the basis of the viewpoint direction information outputted from the information control section 8 (refer to step S11). The display 1 also displays a two-dimensional virtual plane in which the viewing angle icon 5 is turned on the basis of the viewpoint shift information for turning the viewing angle icon 5 (refer to step S12).

(8) VIEWPOINT SHIFT OPERATION TOWARD THE RIGHT FRONT, LEFT FRONT, RIGHT REAR, AND LEFT REAR

When the user performs a touch operation on the stereoscopic city map in the three-dimensional virtual space with two fingers (two in step Sb1 of FIG. 4), the operation detecting element 2 detects the distance and the direction from the first touch position, at which the touch operation was performed first, to the second touch position, at which the touch operation was performed next, in time sequence, and outputs them to the information control section S. The information control section 3 determines the position of the midpoint between the first touch position and the second position on the basis of the first touch position and the second position. The information control section 3 then generates viewpoint shift information including the speed or the acceleration at which the viewpoint is to be shifted from the first touch position toward the midpoint on the basis of the distance and the direction from the first touch position to the midpoint and outputs it to the display 1.

For example, when the second touch position is at the upper right, seen from the first touch position (right in step Sb3 and upper in step Sb4), the information control section 3 generates viewpoint shift information for shifting the viewpoint ahead on the right and outputs it to the display 1. When the second touch position is at the lower right, seen from the first touch position (right in step Sb3 and lower in step Sb4), the information control section 3 generates viewpoint shift information for shifting the viewpoint toward the left rear and outputs it to the display 1. When the second touch position is at the upper right or, alternatively, at the lower left, seen from the first touch position, the information control section 3 also generates viewpoint shift information in accordance with the above-described processing procedure and outputs it to the display 1.

The information control section 3 also determines the position of a split point at which the line connecting the first touch position and the second touch position is split in a designated proportion, and when the split position is moved, the information control section 3 generates viewpoint shift information including the speed or acceleration at which the viewpoint is to be shifted, on the basis of the shifted distance and shift direction of the split point and outputs it to the display 1.

For example, when the position of the split point is moved upward in time sequence, the information control section 3 generates viewpoint shift information for increasing the speed or acceleration at which the viewpoint is to be shifted, on the basis of the shifted distance of the midpoint and outputs it to the display 1.

When the position of the split point is moved downward in time sequence, the information control section 3 generates viewpoint shift information for decreasing the speed or acceleration at which the viewpoint is to be shifted, on the basis of the shifted distance of the midpoint and outputs it to the display 1.

The split point may be an internal dividing point at which the line connecting the first touch position and the second position is divided internally in a designated proportion or, alternatively, may be an external dividing point at which the line connecting the first touch position and the second position is divided externally in a designated proportion.

The display 1 displays a three-dimensional virtual space seen from a viewpoint shifted in time sequence and a two-dimensional virtual plane in which the viewpoint display icon is shifted in time sequence, on the basis of the viewpoint shift information outputted from the information control section 3 (steps S13 to S20).

(9) VERTICALLY UPWARD AND DOWNWARD VIEWPOINT SHIFT OPERATION

When the user performs a touch operation on the stereoscopic city map in the three-dimensional virtual space with three or more n fingers (three in step Sb1), the operation detecting element 2 detects the position of the center of the first to $n^{th}$ touch positions in time sequence and outputs it to the information control section 3. The information control section 3 generates viewpoint shift information for shifting the viewpoint vertically on the basis of the time-series changes of the central position of the first to $n^{th}$ touch positions and outputs it to the display 1. For example, when the central point of the first to $n^{th}$ touch positions is shifted vertically upward after the touch operation, the information control section 3 generates viewpoint shift information for shifting the viewpoint position vertically upward and outputs it to the display 1. Alternatively, when the central point of the first to $n^{th}$ touch positions is shifted vertically downward after the touch operation, the information control section 3 generates viewpoint shift information for shifting the viewpoint position vertically downward and outputs it to the display 1. The display 1 displays a three-dimensional virtual space, which is seen from a viewpoint shifted vertically upward or vertically downward, on the basis of the viewpoint shift information outputted from the information control section 3 (steps S21 to S22).

Figure 5:
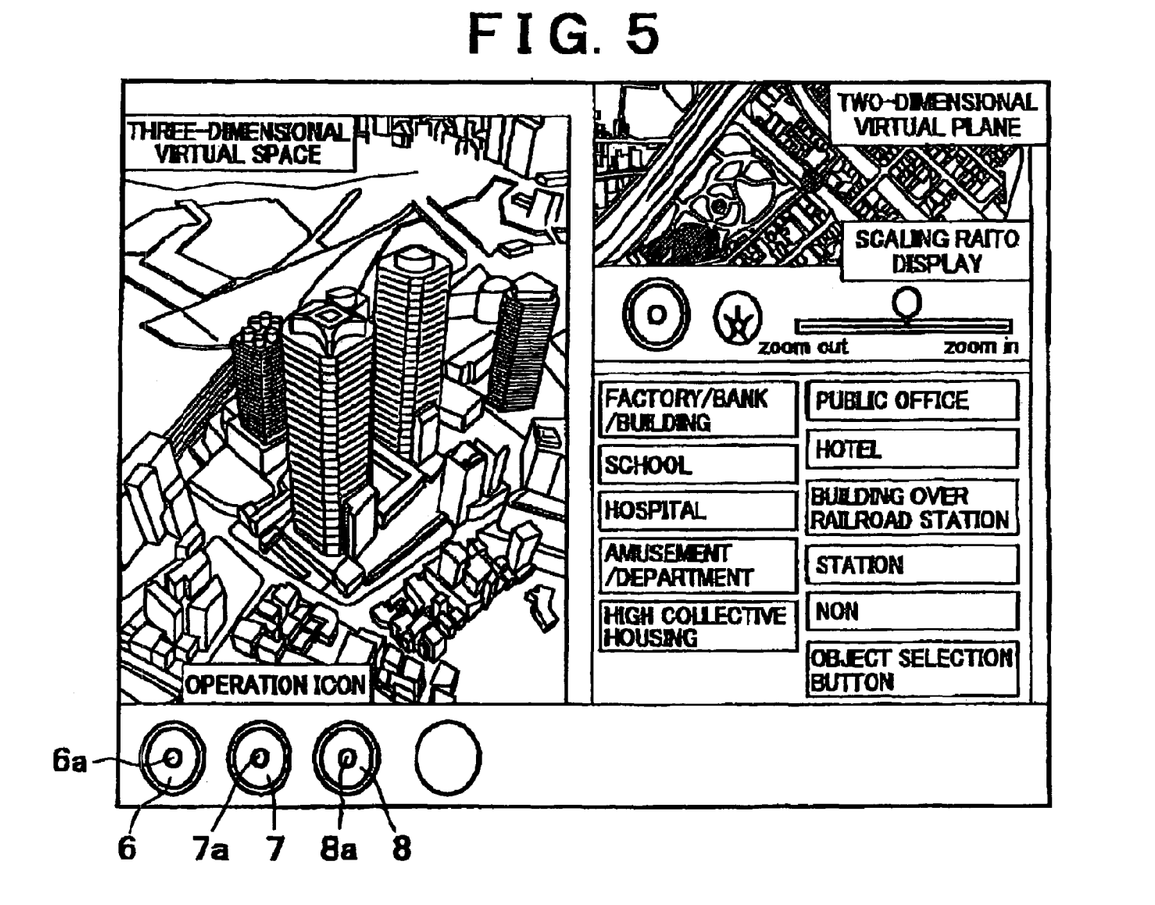
FIG. 5 is a diagram of a control screen for searching a building in neighborhoods.

As described above, a viewpoint shift operation, a viewpoint direction shift operation, a forward or backward shift operation, an upward or downward shift operation, a rightward or leftward turning operation, and a scaling operation can be performed in the two-dimensional virtual plane or the three-dimensional virtual space with one, two, or three or more fingers in a manner close to that in a real space, thus allowing the user to feel a sense of unity with a virtual space shift operation An example will then be described in which the virtual-space shift control apparatus according to the embodiment of the present invention is applied to a real-estate brokerage system. FIG. 5 is a diagram of an operation screen for searching a building (factory, bank, building, public and municipal offices, school, hotel, hospital, building built over a railroad station, amusement facilities, department store, station, high-rise collective housing, etc. in the neighborhood. When the user selects a target building, with an object selection button in FIG. 5, only the target building is displayed with the color changed to a color distinguishable from other buildings, on the map in the two-dimensional virtual plane and the stereoscopic map in the stereoscopic map in the three-dimensional virtual space. Also, FIG. 5 displays a route when a man/woman travels from the present location to the object. Therefore, the user can get a sense of the distance and the direction to the target building.

FIG. 5 also displays three hemispherical operation icons to which operations similar to the above-described operations are allocated in response to the number of operating fingers, wherein an operation icon 6 is provided for one-finger operation, an operation icon 7 is provided for two-finger operation, and an operation icon 8 is provided for three-finger operation. The operation icons 6 to 8 have drag sections 6a, 7a, and 8a, respectively, at the center of each hemisphere. When the user performs a drag operation with the drag section of the operation icon, the operation detecting element 2 detects the distance and the direction from the starting point to the end point of the drag operation in time sequence and outputs them to the information control section 3. The information control section 3 generates viewpoint shift information for shifting the viewpoint on the basis of the time-series changes of the distance and the direction from the starting point to the end point of the drag operation and outputs it to the display 1. The display 1 displays a virtual space image on the basis of the viewpoint shift information outputted from the information control section 3.

This solves a problem in that when a touch operation or a drag operation is made with a pointing device of a certain width, such as a finger, the displayed part that is the object of the touch operation or the drag operation cannot be seen. In other words, the operation icon allows the execution of the series of virtual space shift control processes of the embodiment in a region near the display screen but does not overlap therewith.

Figure 6:
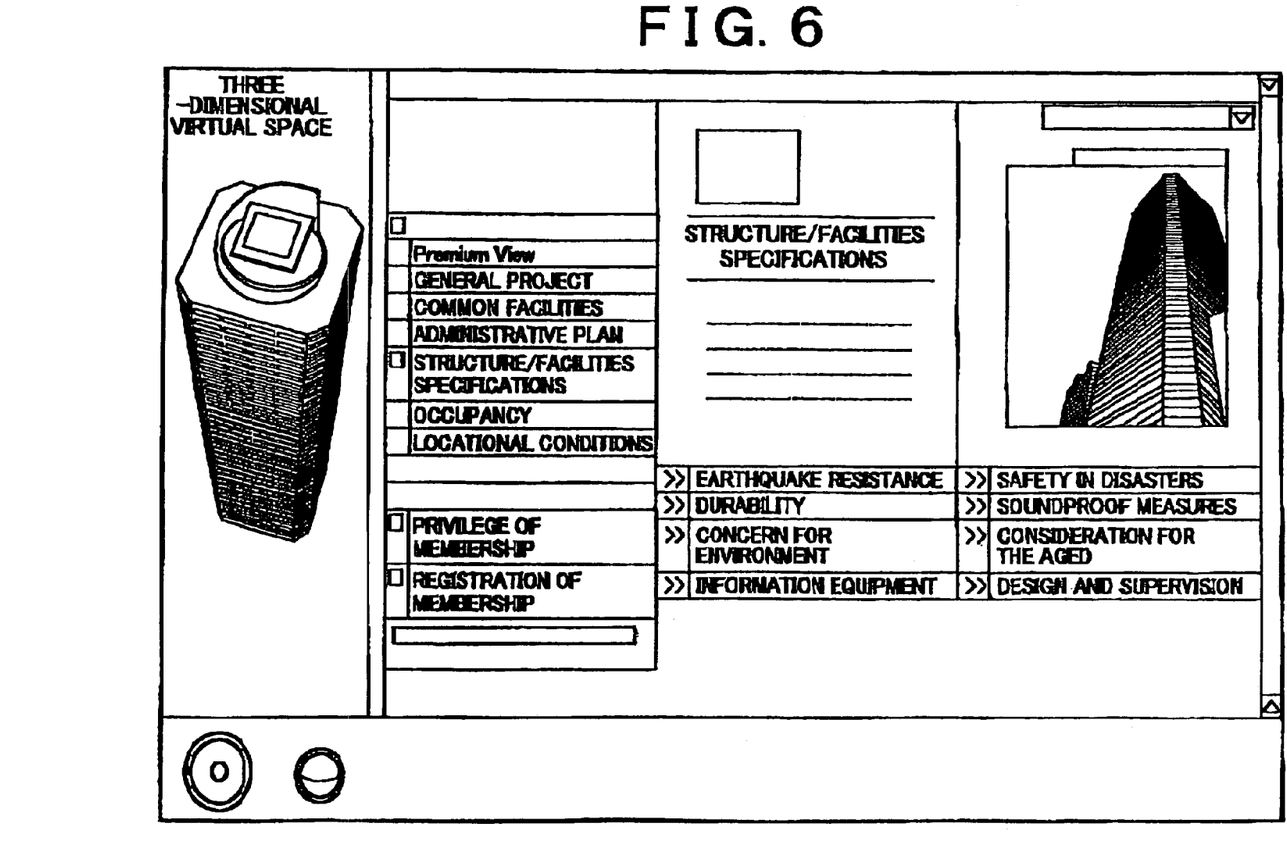
FIG. 6 in a diagram of an example of the image of the external appearance of a condominium in which the virtual-space shift control apparatus is used for a real-estate brokerage system.

FIG. 6 is a diagram of an example of the image of the external appearance of a condominium in which the virtual-space shift control apparatus is used for a real-estate brokerage system. The appearance of the CG (computer graphic) high-rise condominium displayed in a three-dimensional virtual space can be seen from various viewpoints by upward or downward viewpoint shift operation and right-handed or left-handed viewpoint turning operation in the embodiment.

Figure 7:
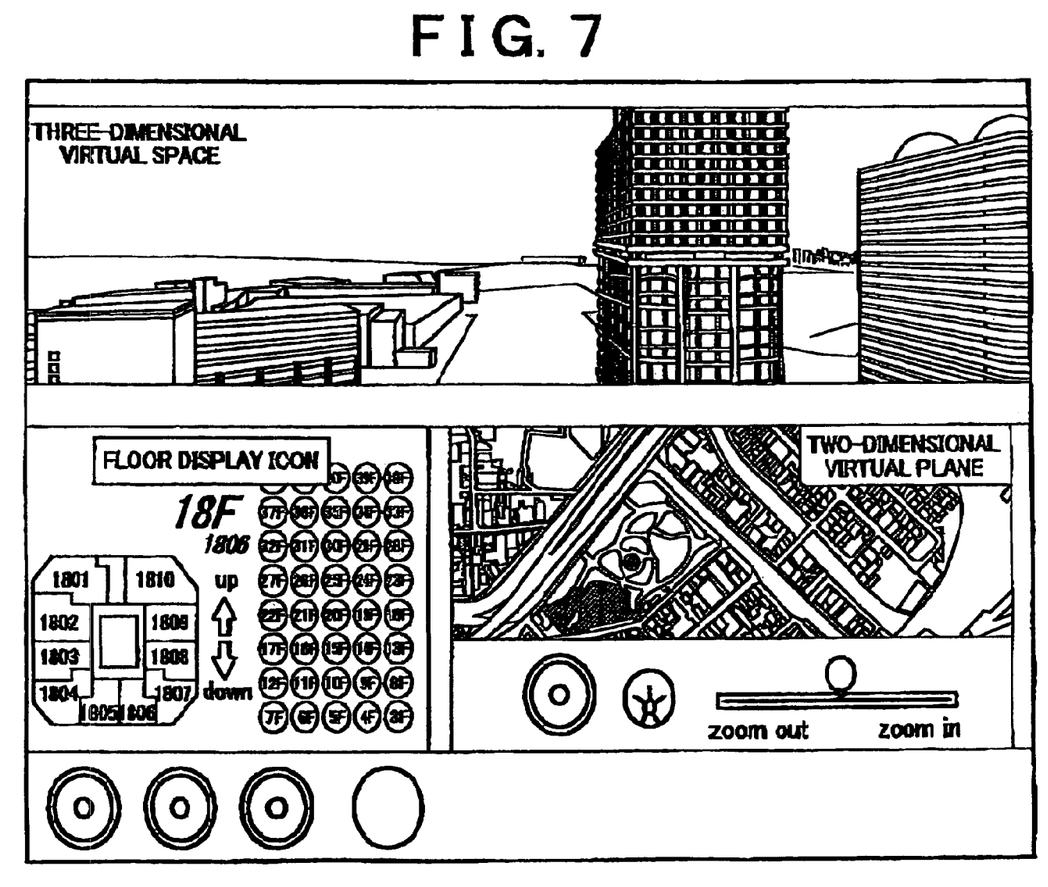
FIG. 7 is a diagram showing the appearance of room No. 1,806 on the 18$^{th}$ floor of the condominium of FIG. 6.

FIG. 7 is a diagram showing the appearance of room No. 1,806 on the $18^{th}$ floor of the condominium of FIG. 6. By selecting a target floor and room with a floor display icon of FIG. 6, viewpoint information is generated so as to shift the viewpoint to the window of the target room, so that the view from the target window can be enjoyed in the virtual space.

Figure 8:
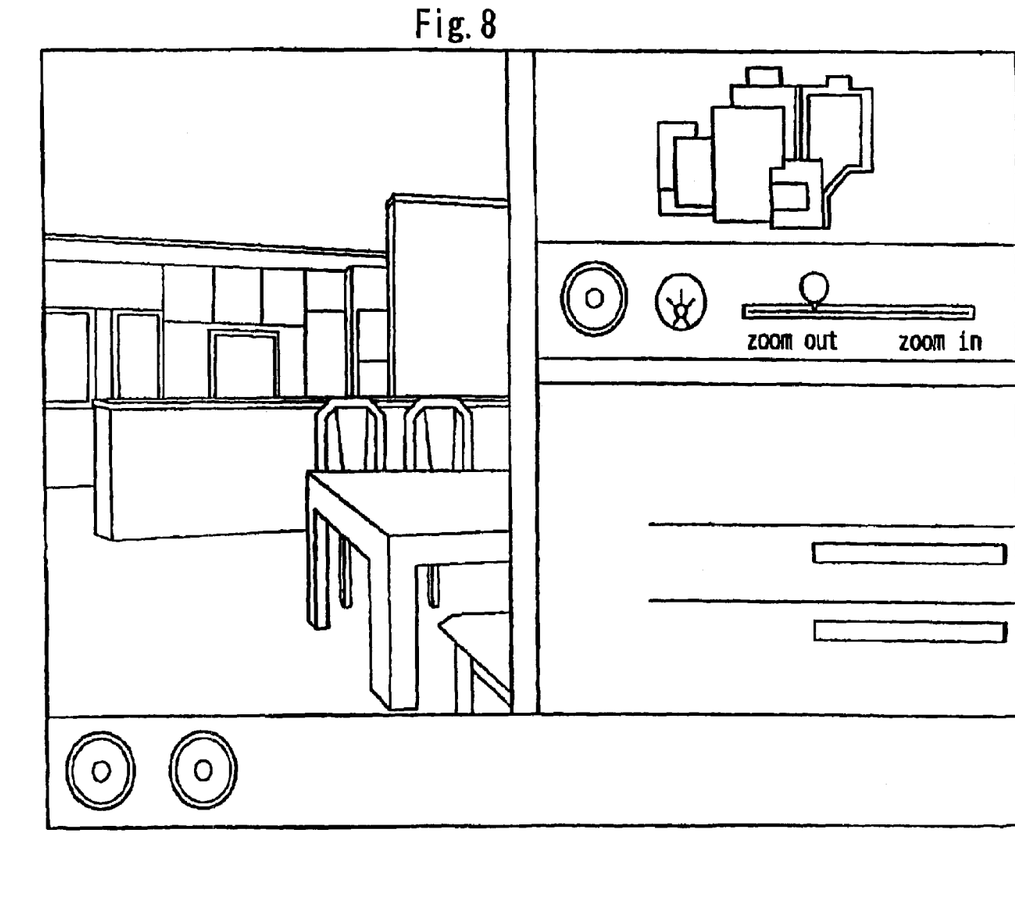
FIG. 8 is a diagram showing the interior of the room of the condominium of FIG. 7.

FIG. 8 is a diagram showing the interior of the room of the condominium of FIG. 7, in which the layout drawing of the room is displayed in a two-dimensional virtual plane; and the stereoscopic view of the room seen from the position of the viewpoint display icon which is displayed on the layout drawing of the room is displayed in a three-dimensional virtual space. The virtual space control apparatus can also be applied to such a room space, wherein a viewpoint shift operation, a viewpoint direction shift operation, a forward or backward shift operation an upward or downward shift operation, a rightward or leftward turning operation, and a scaling operation can be performed in the two-dimensional virtual plane or the three-dimensional virtual space with one, two, or three or more fingers in a manner close to that in a real space, thus allowing the user to perform various virtual space shift operations by a simple operation with a finger or the like.

The virtual-space shift control apparatus has therein a computer system. The series of processes of the virtual space shift control are stored in a recording medium which can be read by a computer in the form of a program. By reading and executing the program by the computer, the above-described processes are performed. The computer readable recording medium refers to a magnetic disc, a magneto-optical disc, a CD-ROM, a DVD-ROM, a semiconductor memory and so on. It is also possible that the computer program is distributed to a computer over a communication line and the computer that has received the distribution executes the program.

According to the present invention, as described above, the virtual-space shift control system for shifting a virtual space image displayed on a display screen includes detecting a touch operation or a drag operation of a pointing device having a plurality of pointing elements, which is performed on the display screen; generating viewpoint position information of the virtual space image on the basis of the detection of the detecting element; and generating a three-dimensional image for generating data on virtual space image seen from a viewpoint indicated by viewpoint position information and outputting it to the display. This thus provides the advantage that the user can perform various virtual space shift operations by a simple operation with a finger or the like.

According to the invention, in the virtual-space shift control system for shifting a virtual space image displayed on a display screen, the operation detecting element detects the number of pointing elements and the respective touch positions of the plurality of pointing elements, the pointing elements performing a touch operation or a drag operation on a prescribed display area on which a virtual space image is displayed; the information control section generates viewpoint shift information for shifting the viewpoint on the virtual space image on the basis of the number of the pointing elements and the respective touch positions of the pointing elements and outputs it to the display; and the display displays the virtual space on the basis of the shift information outputted from the information control section. This thus provides the advantages of allowing the allocation of various virtual space shift operations on the basis of the number of the pointing elements and the respective touch positions of the pointing elements, and allows the user to perform various virtual space shift operations by a simple operation with a finger or the like.

According to the invention, the display displays an operation icon for operating the viewpoint in the virtual space; and the information control section receives time-series data on the distance and the direction from the starting point to the end point at which a drag section of the operation icon is dragged and generates viewpoint shift information for shifting the viewpoint on the basis of the time-series changes of the distance and the direction from the starting point to the end point. This thus provides the advantage that the display part does not go out of sight, owing to the touch operation and the drag operation.

What is claimed is:

1. A virtual-space shift control apparatus, comprising:
   a display having a display area on which a virtual space image is displayed;
   a detecting element that optically detects a touch operation or a drag operation of a pointing device having a plurality of pointing elements, performed on the display;
   a viewpoint-position information generator that generates viewpoint position information of the virtual space image based on the optically detected touch or drag operation of the detecting element; and
   a three-dimensional image generator that generates data on the virtual space image seen from a viewpoint indicated by the viewpoint position information and outputting a three-dimensional virtual image to the display, said display simultaneously displaying a virtual plane formed of a two-dimensional view of said virtual image and said three-dimensional virtual image.

2. A virtual-space shift control apparatus, comprising:
   an operation detecting element that optically detects a plurality of pointing elements of a pointing device and respective touch positions of the plurality of pointing elements, the pointing device performing a touch operation or a drag operation on a prescribed display area on which a virtual space image is displayed;
   an information control section that generates viewpoint shift information for shifting a viewpoint of the virtual space image based on the plurality of pointing elements and the respective touch positions of the plurality of pointing elements and outputting viewpoint shift information to be displayed; and
   a display that displays the virtual space image based on the viewpoint shift information outputted from the information control section, said display displaying a virtual plane formed of a two-dimensional virtual image and a virtual space formed of a three-dimensional image simultaneously.

3. The virtual-space shift control apparatus according to claim 2, wherein the information control section generates the viewpoint shift information for shifting a position of the viewpoint to the touch position based on a position of the touch operation by one of the plurality of pointing elements.

4. The virtual-space shift control apparatus according to claim 2, wherein the information control section receives time-series data of a distance and a direction from a starting point to an end point of the drag operation by one of the plurality of pointing elements and generates the viewpoint shift information for shifting the viewpoint based on the time-series data of the distance and the direction from the starting point toward the end point.

5. The virtual-space shift control apparatus according to claim 2, wherein
   a viewpoint icon for the virtual space, which is displayed in the virtual plane, receives time-series data of a distance and a direction from a starting point to an end point of the drag operation by one of the plurality of pointing elements, and the information control section generates the viewpoint shift information for shifting the viewpoint in the virtual space based on the time-series data of the distance and the direction from the starting point to the end point of the drag operation.

6. The virtual-space shift control apparatus according to claim 2, wherein
   a viewing angle icon for the viewpoint in the virtual space, which is displayed in the virtual plane, receives data of a turning angle of the drag operation by one of the plurality of pointing elements, and the information control section generates the viewpoint shift information for turning the viewing angle icon by the turning angle.

7. The virtual-space shift control apparatus according to claim 2, wherein the information control section receives data of a distance and a direction from a first touch position of an initial touch operation to a second touch position of a next touch operation, and generates viewpoint shift information for shifting the viewpoint based on the distance and the direction from the first touch position to the second touch position.

8. The virtual-space shift control apparatus according to claim 7, wherein the information control section determined a position of a split point at which a line connecting the first touch position and the second touch position in a designated proportion based on the first touch position and the second touch position, and generates the viewpoint shift information for changing a speed or an acceleration at which the viewpoint is shifted, based on time-series changes of the position of the split point.

9. The virtual-space shift control apparatus according to claim 2, wherein
   the information control section receives time-series data of a distance between touch positions by two of the plurality of pointing elements, and generates scale information for enlarging or reducing the virtual plane based on time-series changes of the distance between the touch positions by the two pointing elements.

10. The virtual-space shift control apparatus according to claim 2, wherein the information control section receives time-series data on a position of a central point of first to $n^{th}$ touch positions, and generates the viewpoint shift information for shifting the viewpoint based on the time-series changes of the position of the central point of the first to $n^{th}$ touch positions.

11. The virtual-space shift control apparatus according to claim 2, wherein
    the display displays an operation icon for operating the viewpoint in the virtual space; and
    the information control section receives time-series data of a distance and a direction from a starting point to an end point of the drag operation of a drag section of the operation icon, and generates viewpoint shift information for shifting the viewpoint based on time-series changes of the distance and the direction from the starting point to the end point.

12. A virtual-space shift control method comprising:
    optically detecting a touch operation or a drag operation of a pointing device having a plurality of pointing elements, which is performed on a display screen;

generating viewpoint position information of a virtual space image based on the optically detected touch or drag operation; and generating a three-dimensional image for generating data on the virtual space image seen from a viewpoint indicated by the viewpoint position information and outputting it to the display, said display simultaneously displaying a virtual plane formed of a two-dimensional view of said virtual image and said three-dimensional virtual image.

13. A virtual-space shift control method comprising:

optically detecting a plurality of pointing elements of a pointing device and respective touch positions of the plurality of pointing elements, the pointing device performing a touch operation or a drag operation on a prescribed display area on which a virtual space image is displayed;

generating viewpoint shift information for shifting a viewpoint on the virtual space image based on the plurality of pointing elements and the respective touch positions of the pointing elements, and outputting the shifted virtual space image to the display; and displaying the virtual space image based on the viewpoint shift information;

displaying a virtual plane formed of a two-dimensional virtual image and a virtual space formed of a three-dimensional virtual image simultaneously.

14. The virtual-space shift control method according to claim 13, further comprising generating the viewpoint shift information or shifting a position of the viewpoint to a touch position, based on a position of the touch operation by one of the plurality of pointing elements.

15. The virtual-space shift control method according to claim 13, further comprising receiving time-series data on a distance and a direction from a starting point to an end point of the drag operation by one of the plurality of pointing elements, and generating the viewpoint shift information for shifting the viewpoint in the virtual space image based on the time-series data on the distance and the direction from the starting point to the end point.

16. The virtual-space shift control method according to claim 13, further comprising:

displaying a virtual plane formed of a two-dimensional virtual image and a virtual space formed of a three-dimensional virtual image simultaneously;

displaying a viewpoint icon for the virtual space in the virtual plane that receives time-series data on a distance and a direction from a starting point to an end point of the drag operation by one of the plurality of pointing elements; and generating the viewpoint shift information for shifting the viewpoint in the virtual space based on the time-series data on the distance and the direction from the starting point to the end point of the drag operation.

17. The virtual-space shift control method according to claim 13, further comprising:

displaying in the virtual plane, a viewing angle icon for the viewpoint in the virtual space;

receiving data on a turning angle of the drag operation by one of the plurality of pointing elements; and generating the viewpoint shift information for turning a viewing angle by the turning angle.

18. The virtual-space shift control method according to claim 17, further comprising:

receiving data on a distance and a direction from a first touch position of an initial touch operation to a second touch position of a next touch operation; and generating the viewpoint shift information for shifting the viewpoint based on the distance and the direction from the first touch position to the second touch position.

19. The virtual-space shift control method according to claim 18, further comprising:

determining a position of a split point at which a line connecting the first touch position and the second touch position is split in a designated proportion based on the first touch position and the second touch positions and generating the viewpoint shift information for changing a speed or an acceleration at which the viewpoint is shifted, based on time-series changes of the position of the split point.

20. The virtual-space shift control method according to claim 13, further comprising:

receiving time-series data on a distance between the touch positions by two of the plurality of pointing elements; and generating scale information for enlarging or reducing the virtual plane based on time-series data on the distance between the touch positions by the two pointing parts.

21. The virtual-space shift control method according to claim 13, further comprising:

receiving time-series data on a position of a central point of first to $n^{th}$ touch positions; and generating viewpoint shift information for shifting the viewpoint based on time-series changes of the position of the central point of the first to $n^{th}$ touch positions.

22. The virtual-space shift control method according to claim 13, wherein further comprising:

displaying an operation icon for operating the viewpoint in the virtual space image;

receiving time-series data on a distance and a direction from a starting point to an end point of the drag operation of a drag section of the operation icon; and generating viewpoint shift information for shifting the viewpoint based on the time-series changes of the distance and the direction from the starting point to the end point.

23. A program used as a virtual-space shift control apparatus comprising:

a detecting element that optically detects a touch operation or a drag operation of a pointing device having a plurality of pointing elements, performed on a display screen;

a viewpoint-position information generator that generates viewpoint position information of a virtual space image based on the optically detected touch or drag operation of the detecting element; and a three-dimensional image generator that generates data on the virtual space image seen from a viewpoint indicated by the viewpoint position information and outputting a three dimensional image to the display, said display simultaneously displaying a virtual plane formed of a two-dimensional view of said virtual image and said three-dimensional virtual image.

24. A recording medium in which a program used for executing a virtual-space shift control apparatus comprising:

a detecting element that optically detects a touch operation or a drag operation of a pointing device having a plurality of pointing elements, performed on a display screen;

a viewpoint-position information generator that generates viewpoint position information of a virtual space image based on the detected touch or drag operation of the detecting element; and a three-dimensional image generator that generates data on the virtual space image seen from a viewpoint indicated by the viewpoint position information and outputting a three dimensional image to the display, said display simultaneously displaying a virtual plane formed of a two-dimensional view of said virtual image and said three-dimensional virtual image.

* * * * *